(12) United States Patent
Noguchi et al.

(10) Patent No.: US 8,704,949 B2
(45) Date of Patent: Apr. 22, 2014

(54) VIDEO PROCESSING APPARATUS AND VIDEO PROCESSING METHOD

(75) Inventors: Masato Noguchi, Kanagawa (JP); Masaaki Yamane, Kanagawa (JP); Tomoji Mizutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 12/414,867

(22) Filed: Mar. 31, 2009

(65) Prior Publication Data

US 2009/0244368 A1 Oct. 1, 2009

(30) Foreign Application Priority Data

Apr. 1, 2008 (JP) ................. P2008-095447

(51) Int. Cl.
*H04N 9/74* (2006.01)
*H04N 7/01* (2006.01)
*H04N 11/20* (2006.01)

(52) U.S. Cl.
USPC .......................................... 348/584; 348/448

(58) Field of Classification Search
None
See application file for complete search history.

(56) References Cited

U.S. PATENT DOCUMENTS 5,430,488 A * 7/1995 Hedley ........................ 348/446
2004/0212730 A1 * 10/2004 MacInnis et al. ............ 348/441

FOREIGN PATENT DOCUMENTS

| JP | 2000 197072 | 7/2000 |
| JP | 2007 13466 | 1/2007 |
| JP | 2007 295226 | 11/2007 |

* cited by examiner

*Primary Examiner* — Jefferey Harold
*Assistant Examiner* — Michael Teitelbaum
(74) *Attorney, Agent, or Firm* — Sony Corporation (57) ABSTRACT

Disclosed herein is a video processing apparatus for performing video processing compatible with a dual link progressive scheme, said video processing apparatus including: two video processing circuits; and a control section.

10 Claims, 9 Drawing Sheets

FIELD 1

FIELD 2

FIG. 9B

TIMING-UNADJUSTED DUAL LINK
PROGRESSIVE SIGNAL PROCESSING

LINK A    LINK B    FRAME 1    FRAME 2

VIDEO PROCESSING APPARATUS AND VIDEO PROCESSING METHOD

BACKGROUND OF THE INVENTION

1. Field of the Invention

The present invention relates to a video processing apparatus and a video processing method for carrying out video processing compatible with the dual link progressive scheme.

2. Description of the Related Art

Heretofore, the video compositing equipment called effect switchers has been used by TV broadcasting stations and video editing studios to obtain a special effect called keying. Keying is a process whereby a key fill signal (i.e., a video signal superposed as a foreground onto a background image) is superposed onto the area designated by a key source signal (a video signal for designating the area on which to superpose the image, the area being one whose signal level is at least a predetermined threshold value) in the background image (a major video signal constituting the screen).

Video processing including wipes is carried out by waveform generating means such as wipe key generators or pattern generators generating key signals. The key signals may be used to cut out two images inversely before compositing the two. In another example, no input image is cut out. Instead, internally generated signals (monochrome or multicolor) may be clipped using signal generated by the waveform generating means for use as images.

The standard for the physical layer of 3G-SDI covering such requirements as signal amplitude and signal rise/fall time is defined by SMPTE (Society of Motion Picture and Television Engineers) 424M. The data formats and mapping requirements of 3G-SDI are standardized by SMPTE 425M.

The data formats and mapping requirements defined by SMPTE 425M include a double speed scheme based on HD-SDI (1080p50/59.94/60), the scheme to convert 12-bit transmissions and dual link HD-SDI into 3G-SDI, and the scheme to convert dual HD-SDI arrangements into 3G-SDI. SMPTE 424M defines the electrical specifications of serial transmissions, as well as the requirements for arranging two data streams into a single data stream. As with SD-SDI and HD-SDI, the standardized items cover signal amplitude, rise/fall times, rise/fall time differences, DC offsets, and return losses. Some of the above-described aspects of the standards are discussed illustratively in Japanese Patent Laid-open Nos. 2000-197072 and 2007-13466.

SUMMARY OF THE INVENTION

There are limits to the speed for the processing of signals by the devices making up circuitry. It may happen that a still higher speed of signal processing is either unavailable or is possible but with more costly devices (e.g., at least twice as expensive as ordinary types). This bottleneck may be bypassed by the dual link arrangement involving two sets of inexpensive devices amounting to a more economical solution.

High-speed circuits have been known to pose problems specific to high-frequency circuits. As a result, these circuits have been difficult to implement in a circuit board setup. If the circuit board is designed with circuits operating at half the target speed, then the overall result is an appreciably inexpensive circuit board arrangement.

For video signals, the interlace and progressive schemes exist as two standard signal formats. Where circuits that process the interlace format video signal are operated on a dual link connection, these circuits may be arranged also to process the progressive format video signal. This means that the same equipment and the same circuit boards can be used in two different signal formats depending on purpose, which translates into a significant savings in cost.

It follows that circuit boards of one type need only be manufactured to deal with the two signal formats. Volume production of the circuit boards is helpful in reducing unit costs and attaining a further economy.

In the past, two sets of the waveform processing means were needed to carry out video processing such as wipes in the dual link setup. That was because the waveform processing means constitute part of the above-mentioned processing circuit.

Figure 9A:
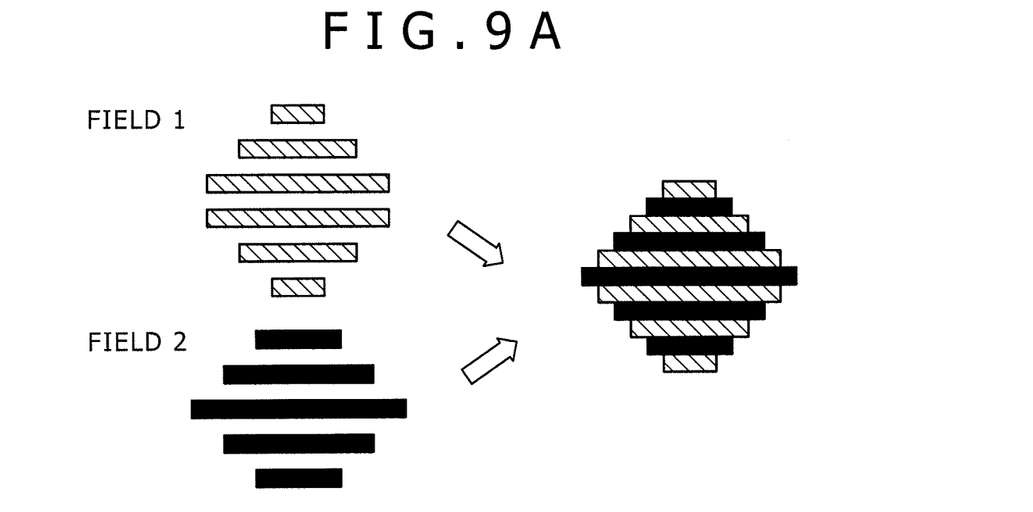
FIGS. 9A and 9B are schematic views showing a typical video output resulting ultimately from the dual link-compatible video processing carried out ordinarily on interlace signals.
Figure 9B:
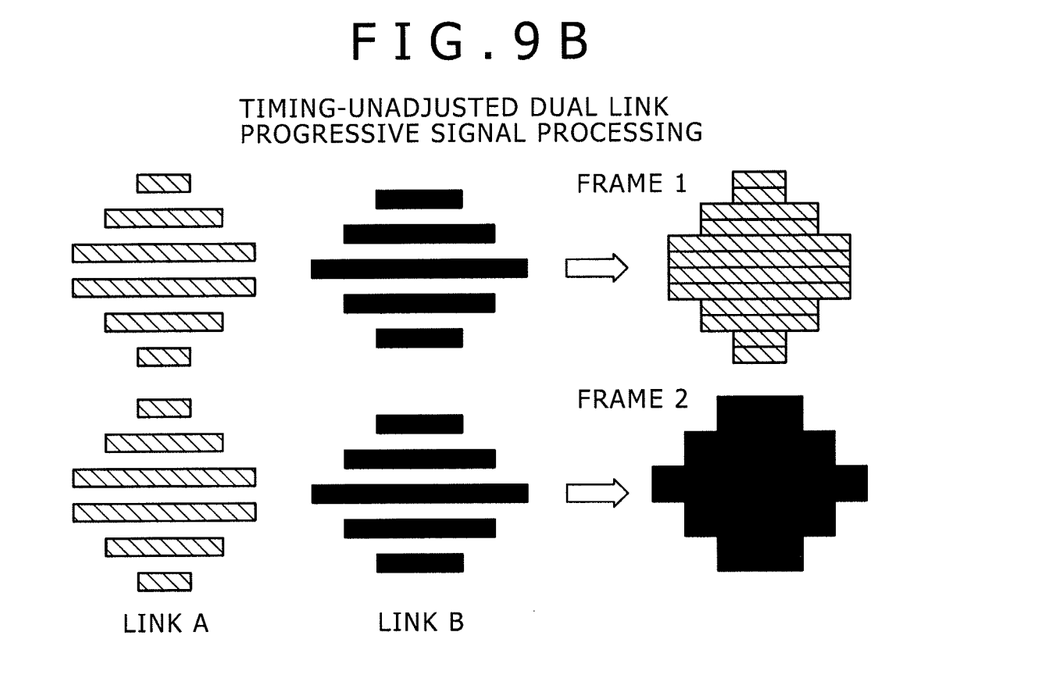

As part of the dual link setup, the two waveform processing means were controlled exactly in the same manner to generate the same waveform. Consequently, one type of video processing performed on the interlace signal as shown in FIG. 9A was also carried out on the progressive signal. The video output that ultimately resulted turned out to be different from one frame to another, as illustrated in FIG. 9B.

That is, the video processing in keeping with the ordinary dual link arrangement involve two streams of exactly the same processing. That means the generated waveform has half the resolution in the vertical direction, which constitutes a significant detriment to image quality.

The present invention has been made in view of the above circumstances and provides arrangements for implementing high-quality video processing such as wipes in the dual link setup.

In carrying out the present invention and according to one embodiment thereof, there is provided a video processing apparatus for performing video processing compatible with a dual link progressive scheme, the video processing apparatus including: two video processing circuits configured to have waveform generating means each; and control means for controlling the two video processing circuits in operation; wherein, upon video processing of a given frame under a progressive scheme, the control means causes one of the two video processing circuits to operate at settings such that the waveform generating means thereof operates on a first field under an interlace scheme while causing the other video processing circuit to operate at settings such that the waveform generating means thereof operates on a second field under the interlace scheme.

Preferably, upon video processing of an odd-numbered frame under the progressive scheme, the control means may cause one of the two video processing circuits to operate at settings such that the waveform generating means thereof operates on the first field under the interlace scheme while causing the other video processing circuit to operate at settings such that the waveform generating means thereof operates on the second field under the interlace scheme; and wherein, upon video processing of an even-numbered frame under the progressive scheme, the control means may cause one of the two video processing circuits to operate at settings such that the waveform generating means thereof operates on the second field under the interlace scheme while causing the other video processing circuit to operate at settings such that the waveform generating means thereof operates on the first field under the interlace scheme.

According to another embodiment of the present invention, there is provided a video processing method for performing video processing compatible with a dual link progressive scheme, the video processing method including the steps of: controlling in operation two video processing circuits configured to have waveform generating means each; upon video processing of a given frame under a progressive scheme, causing one of the two video processing circuits to operate at settings such that the waveform generating means thereof operates on a first field under an interlace scheme; and causing the other video processing circuit to operate at settings such that the waveform generating means thereof operates on a second field under the interlace scheme.

According to the present invention, as outlined above, video processing compatible with the dual link progressive scheme is provided. In operation, two video processing circuits having waveform generating means each are controlled. Upon video processing of a given frame under a progressive scheme, one of the two video processing circuits is operated at settings such that its waveform generation means operates on a first field under an interlace scheme. At the same time, the other video processing circuit is operated at settings such that its waveform generation means operates on a second field under the interlace scheme. The embodiment of the invention thus provides internally generated high-quality signals for the dual link setup and brings about high-quality video processing such as wipes.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

The preferred embodiments of the present invention will now be described in reference to the accompanying drawings. Although the description below will contain many specificities, these should not be construed as limiting the scope of the invention but as merely providing illustrations of some of the presently preferred embodiments of this invention. Many alternatives, modifications and variations will become apparent to those skilled in the art in light of the ensuing description, without departing from the scope of the invention.

Figure 1:
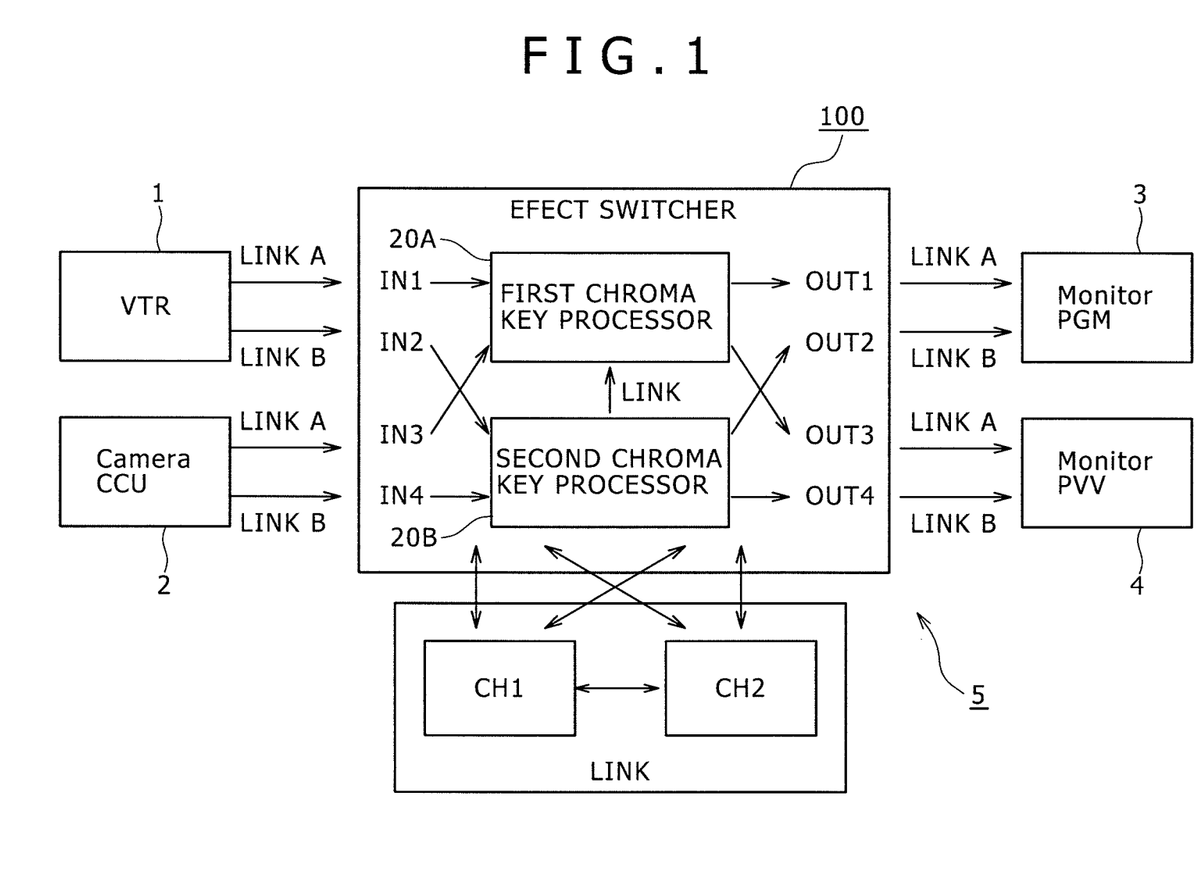
FIG. 1 is a block diagram showing a typical configuration of a dual link video processing system including an effect switcher according to an embodiment of the present invention.

As shown in FIG. 1, the present invention is applied illustratively to an effect switcher 100 as part of a video processing system 5 which gets a first video processor 20A and a second video processor 20B to perform a wipe process on the video signals supplied on a dual link connection from a video reproducing apparatus 1 or from an imaging apparatus 2, the processed video signals being output on the dual link connection to monitors 3 and 4.

In FIG. 1, reference characters CH1 and CH2 stand for digital special effect sections. These sections have circuits that receive input video signals and write the received signals to a memory. The written signals are subject to coordinate transformation and other processes with regard to the input screen before being formed into an image to be output. The processes involved include such special effects as enlarging, contracting, and deforming of images. As such, the digital special effect sections are not directly related to the structures or functions characterizing the present invention. Although this invention may be applied to an internal waveform generation circuit arrangement, the structures and the workings of such an arrangement are the same as those of the effect switcher to be described below. For that reason, the digital special effect sections will not be discussed further in this specification.

As shown schematically in FIG. 1, input/output connections are arranged in such a manner that the first video processor 20A performs processing on the side of link A and the second video processor 20B effects processing on the side of link B. The second video processor 20B is controlled in linkage with the workings of the first video processor 20A, as shown by arrowed links.

Figure 2:
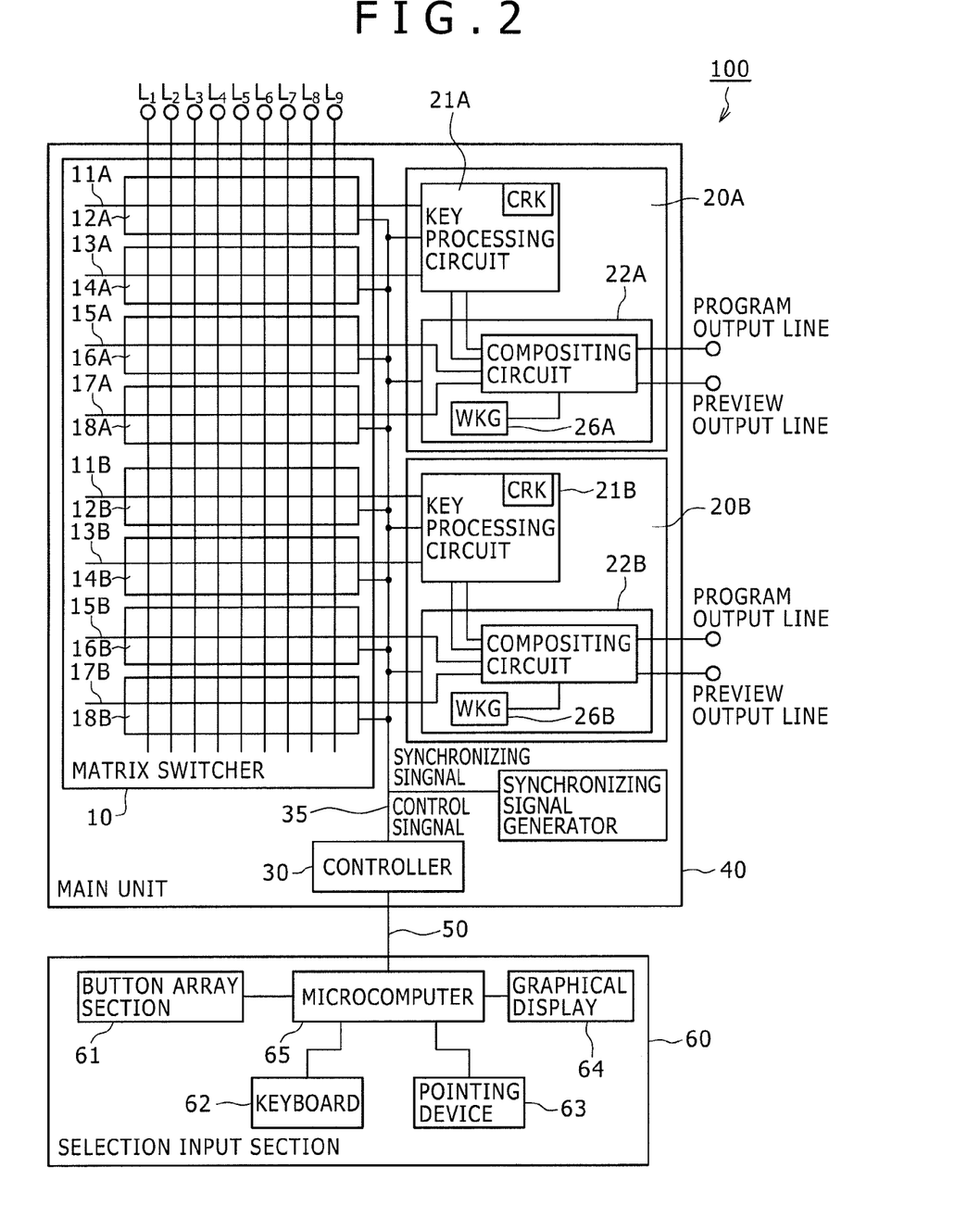
FIG. 2 is a block diagram showing a typical structure of the effect switcher.

The effect switcher 100, as shown in FIG. 2, includes a main unit 40 and a selection input section 60. The main unit 40 contains: a matrix switcher 10 for selecting input video signals on input lines L1 through L9; the first video processor 20A supplied with the video signals input on the input lines L1 through L9 through the matrix switcher 10; the second video processor 20B fed with the video signals on the input lines L1 through L9 via the matrix switcher 10; and a controller 30 for controlling these components. The selection input section 60 is connected to the controller 30 of the main unit 40 by way of a communication channel 50.

In the effect switcher 100, the video signals input on the input lines L1 through L9 include a key source signal and a key fill signal.

The matrix switcher 10 is furnished with a key source intersection array 12A made of switches connected to a key source signal selection input bus 11A that supplies the first video processor 20A with one of the video signals on the input lines L1 through L9 as a key source signal. The matrix switcher 10 is further provided with a key fill intersection array 14A made of switches connected to a key fill signal selection input bus 13A that supplies the first video processor 20A with one of the video signals on the input lines L1 through L9 as a key fill signal. The matrix switcher 10 is also furnished with a first background intersection array 16A made of switches connected to a first background signal selection input bus 15A that supplies the first video processor 20A with one of the video signals on the input lines L1 through L9 as a first background signal. The matrix switcher 10 is further provided with a second background intersection array 18A made of switches connected to a second background signal selection input bus 17A that supplies the first video processor 20A with one of the video signals on the input lines L1 through L9 as a second background signal. The matrix switcher 10 is also furnished with a key source intersection array 12B made of switches connected to a key source signal selection input bus 11B that supplies the second video processor 20B with one of the video signals on the input lines L1 through L9 as the key source signal. The matrix switcher 10 is further provided with a key fill intersection array 14B made of switches connected to a key fill signal selection input bus 13B that supplies the second video processor 20B with one of the video signals on the input lines L1 through L9 as the key fill signal. The matrix switcher 10 is also furnished with a first background intersection array 16B made of switches connected to a first background signal selection input bus 15B that supplies the second video processor 20B with one of the video signals on the input lines L1 through L9 as the first background signal. The matrix switcher 10 is further provided with a second background intersection array 18B made of switches connected to a second background signal selection input bus 17B that supplies the second video processor 20B with one of the video signals on the input lines L1 through L9 as the second background signal.

The first video processor 20A is constituted by a key processing circuit 21A and a compositing circuit 22A. The key processing circuit 21A is connected to the key source signal selection input bus 11A and to the key fill signal selection input bus 13A. The key source signal and the key fill signal selected from the video signals on the input lines L1 through L9 are input to the key processing circuit 21A via the key source signal selection input bus 11A and key fill signal selection input bus 13A, respectively. The key processing circuit 21A proceeds to generate a key signal reflecting control signals from the controller 30, using the input key source signal or by means of an internal waveform generation circuit (i.e., wipe pattern generation circuit). The key processing circuit 21A then feeds the generated key signal and the key fill signal to the compositing circuit 22A.

The compositing circuit 22A is connected to the key processing circuit 21A as well as to the first background signal selection input bus 15A and second background signal selection input bus 17A. The key signal and key fill signal are input to the compositing circuit 22A from the key processing circuit 21A. The first and the second background signals selected from the video signals on the input lines L1 through L9 are input to the compositing circuit 22A via the first background signal selection input bus 15A and second background signal selection input bus 17A, respectively. The compositing circuit 22A performs a keying process whereby the area designated by the key signal fed by the key processing circuit 21A is replaced with the first or the second background signal in order to composite the key fill signal.

The second video processor 20B is constituted by a key processing circuit 21B and a compositing circuit 22B. The key processing circuit 21B is connected to the key source signal selection input bus 11B and to the key fill signal selection input bus 13B. The key source signal and the key fill signal selected from the video signals on the input lines L1 through L9 are input to the key processing circuit 21B via the key source signal selection input bus 11B and key fill signal selection input bus 13B, respectively. The key processing circuit 21B proceeds to generate a key signal reflecting control signals from the controller 30, using the input key source signal or by means of an internal waveform generation circuit (i.e., wipe pattern generation circuit). The key processing circuit 21B then feeds the generated key signal and the key fill signal to the compositing circuit 22B.

The compositing circuit 22B is connected to the key processing circuit 21B as well as to the first background signal selection input bus 15B and second background signal selection input bus 17B. The key signal and the key fill signal are input to the compositing circuit 22B from the key processing circuit 21B. The first and the second background signals selected from the video signals on the input lines L1 through L9 are input to the compositing circuit 22B via the first background signal selection input bus 15B and second background signal selection input bus 17B, respectively. The compositing circuit 22B performs a keying process whereby the area designated by the key signal from the key processing circuit 21B is replaced with the first or the second background signal in order to composite the key fill signal.

In the foregoing paragraphs, the key signal was explained as a binary signal designating either the background signal or the key fill signal. More specifically, the key signal is not a binary signal representing two values but a multivalued signal denoting degrees of density. As such, the key signal designates one of the multiple degrees of density with which to superpose the key fill signal onto the background signal. This permits execution of a video process whereby the key signal appears to constitute a semitransparent area against a visible background.

The controller 30 is composed of a microcomputer. In operation, the controller 30 generates control signals reflecting the selection input signals supplied by the selection input section 60 via the communication channel 50. The control signals thus generated are sent through control lines 35 to the matrix switcher 10, first video processor 20A, and second video processor 20B for operation control purposes.

The selection input section 60 is made up of a microcomputer 65 connected with a button array section 61, a keyboard 62, a pointing device 63 such as a mouse, and a graphical display 64. When buttons of the button array section 61 are operated for input selection, the matrix switcher 10 of the main unit works to select the paired inputs for sides A and B. For example, suppose that the input lines L1 and L2 carry the first video signal for links A and B respectively and that keys are operated to select the first video signal against the first background. In that case, the input line L1 is selected on the first background intersection array 16A and the input line L2 is selected on the second background intersection array 16B. The same operations are performed on the other paired inputs and intersection arrays. If the same apparatus is used to handle images under the interlace scheme, there is no need to switch the paired links; the switching need only be executed on a one-to-one basis with the operations that have been made.

In the effect switcher 100, the selection input section 60 gives instructions to carry out various processes by communicating with the controller 30 of the main unit 40 through the communication channel 50.

The compositing circuit 22A has the background signals input from the first background signal selection input bus 15A and second background signal selection input bus 17A. Given an instruction from the selection input section 60, the compositing circuit 22A either uses the background signal from one of the two buses, or makes the two background signals composited in accordance with a compositing method designating a composite ratio, thereby generating a composited background signal for use in the keying process. The composite ratio may be designated manually by operation of a fader lever on the selection input section 60. In the case of an automatic transition (automatic progression) operation, controls are exercised so that one background signal is replaced over time by the other background signal. For the effect of a mix, the compositing method above illustratively involves adding the two background signals to each pixel, with the signals weighted to reflect the above-mentioned ratio (e.g., if the ratio is 30%, then the first background signal multiplied by 0.3 and the second background signal multiplied by 0.7 are added up). An alternative compositing method for the effect of a wipe may involve superposing the second background signal onto the first background signal in a keying process using a wipe key signal supplied by a wipe key waveform generation circuit (WKG: wipe key generator) 26A in FIG. 2. The key signal generated by the wipe key waveform generation circuit 6 varies with the above-mentioned ratio. In the case of automatic transition, the time "t" for progression is used as the input parameter in determining the boundary for the wipe. Where automatic transition is not in effect, the parameter "t" is replaced by a suitably designated ratio. The above-described workings also apply to the compositing circuit 22B.

In the foregoing paragraphs, two examples of waveform generation were explained: one taking place inside the key processing circuits 21A and 21B, and the other inside the WKG (i.e., inside the compositing circuits 22A and 22B). The relation between the field signal and the control over waveform generation is the same in the two examples, which is one characteristic of the embodiment of the invention. For this reason, the generated waveforms will be regarded as the wipe waveforms in the ensuing description. Either case of waveform generation can be executed in a manner compatible with the dual link progressive scheme (i.e., one of the effects of the embodiment of the present invention), as will be explained below.

Figure 3:
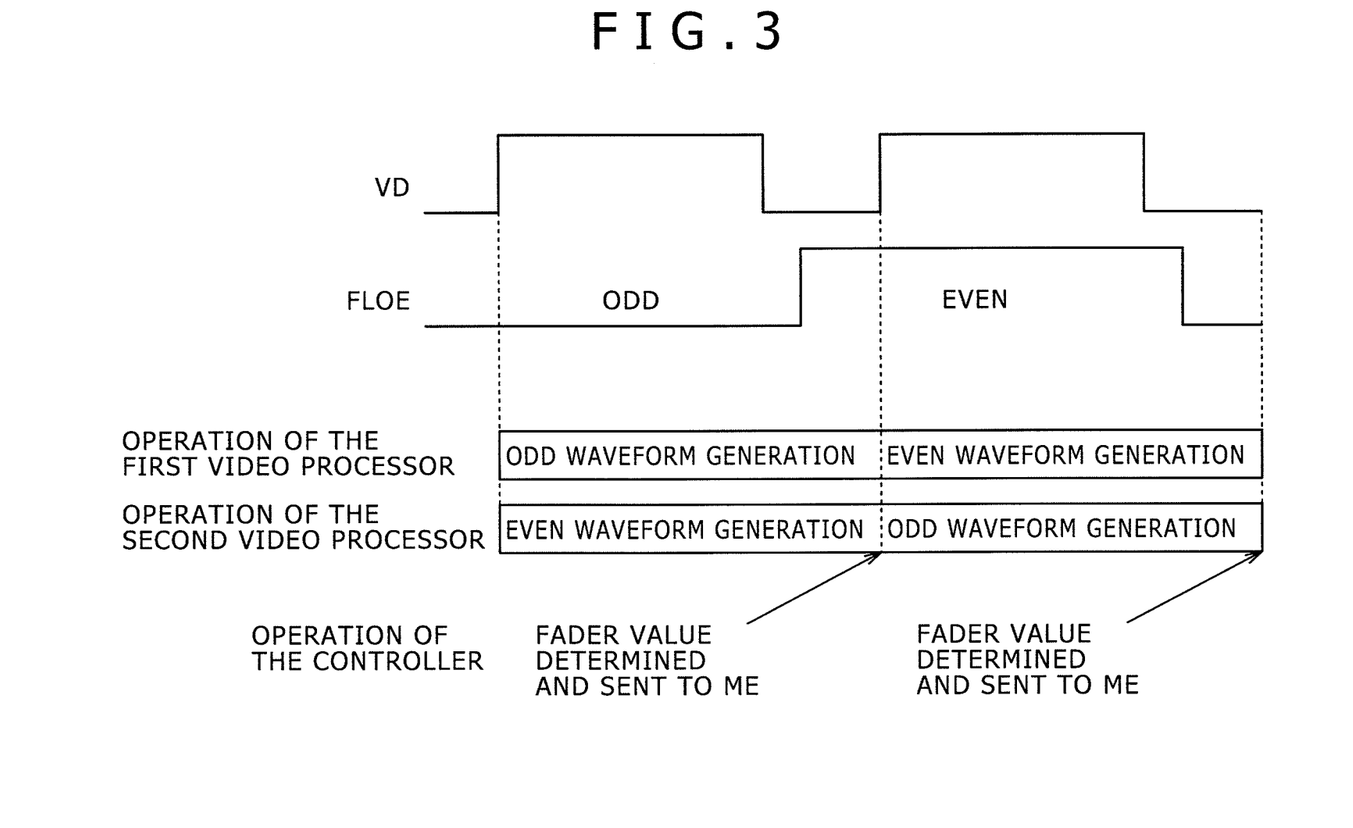
FIG. 3 is a schematic view showing how the generation of wipe waveforms is related to field signals.

FIG. 3 schematically shows how the generation of wipe waveforms is related to field signals. Given an instruction to perform a wipe process from the selection input section 60, the controller 30 of the main unit 40 upon video processing of a given frame under the progressive scheme causes the first video processing circuit 20A to operate at settings such that the waveform generation section thereof (i.e., key processing circuit 21A) operates on a first field under the interlace scheme while causing the second video processing circuit 20B to operate at settings such that the waveform generation section thereof (i.e., key processing circuit 20B) operates on a second field under the interlace scheme, whereby the wipe process compatible with the dual link progressive scheme is carried out.

Figure 4:
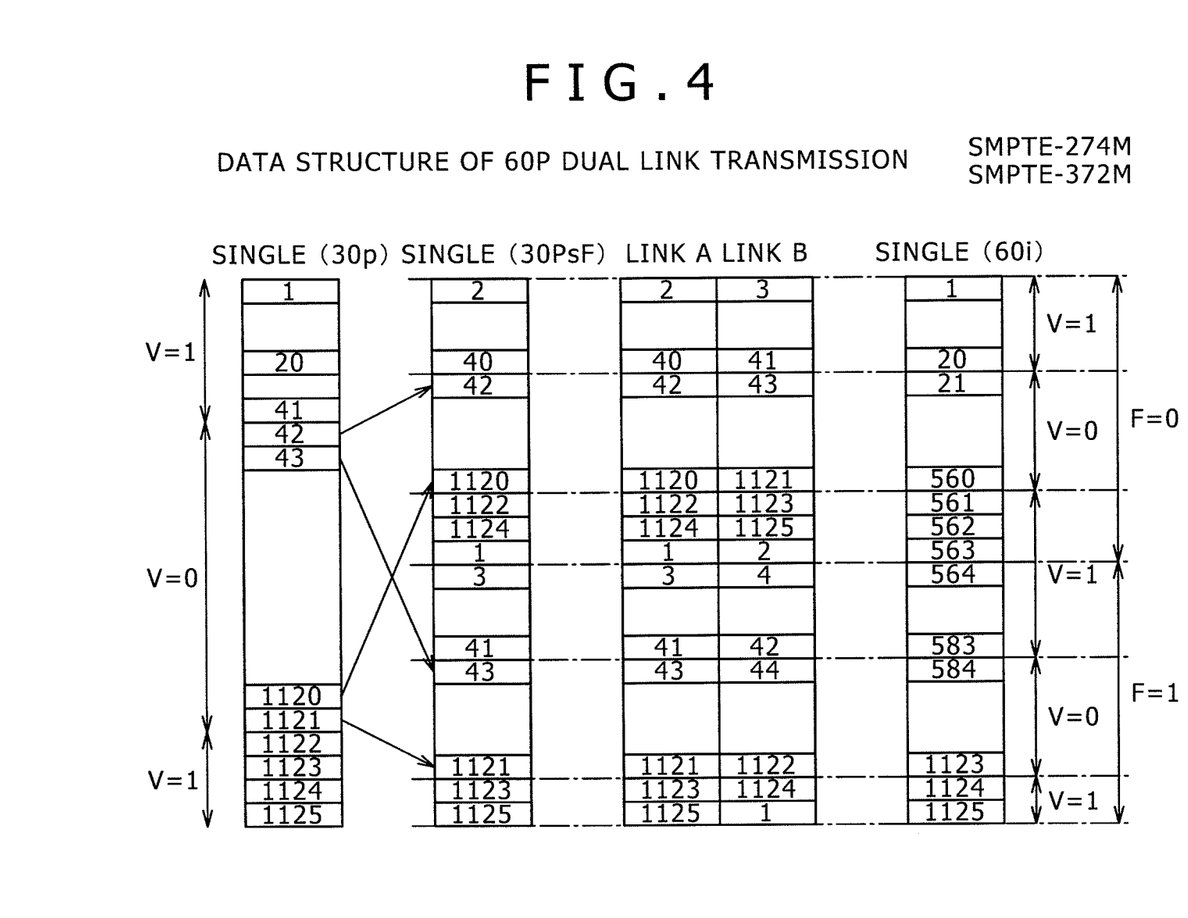
FIG. 4 is a schematic view showing a typical data structure of a dual link progressive (60P) scheme.
Figure 5:
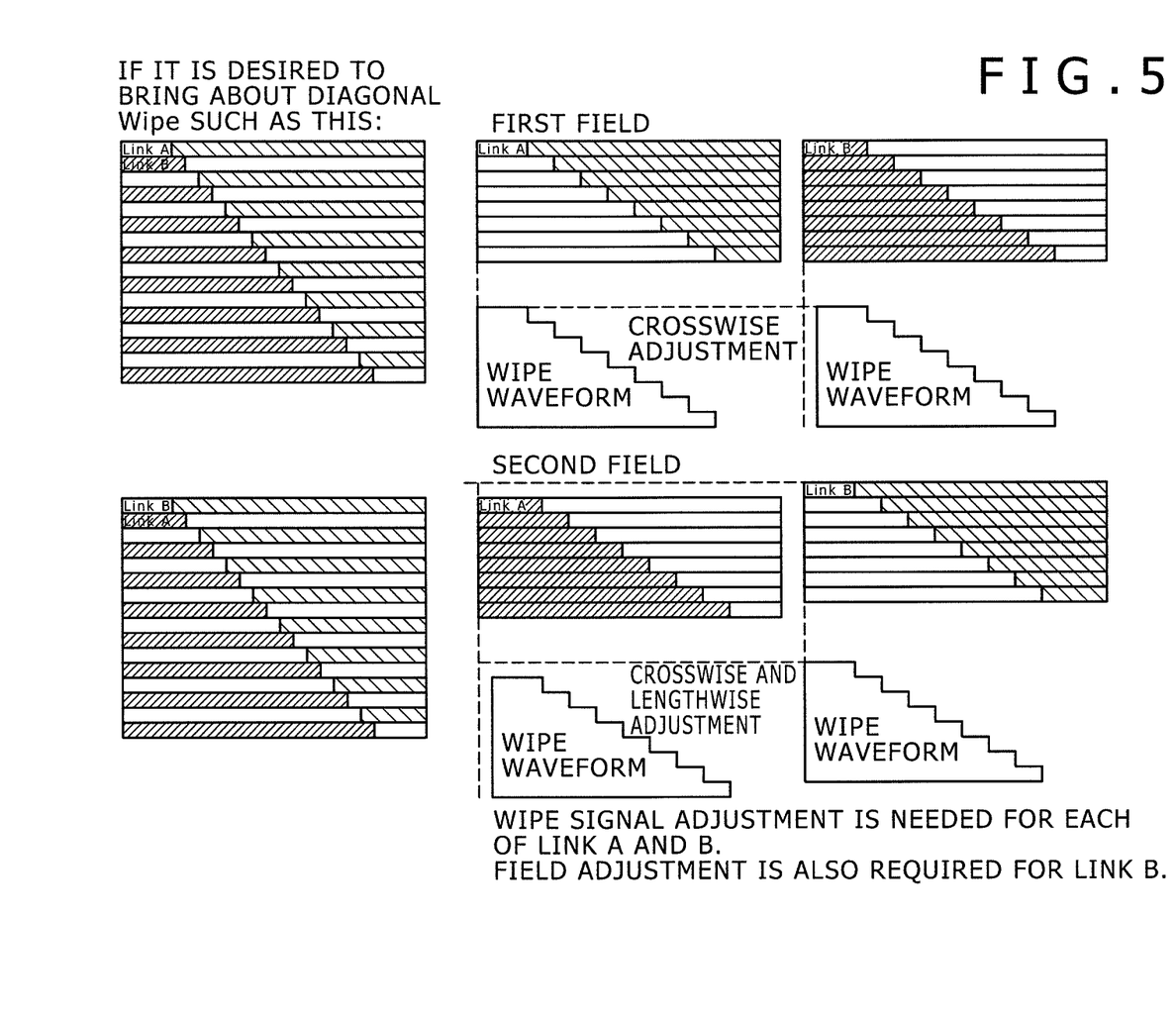
FIG. 5 is a schematic view showing wipe signals needed on links A and B for accomplishing a diagonal wipe.

Under a typical dual link progressive (60P) scheme, of which a typical data structure is shown in FIG. 4, the array of signals (lines) sent through the second field (F=1) is different from that through the first field. This complicates dual stream processing. For example, if a diagonal wipe such as one shown in FIG. 5 is desired to be performed, it is necessary to adjust the wipe signal on each of links A and B. Field adjustment is further needed on link B.

Figure 6A:
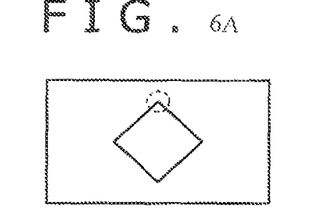
FIGS. 6A, 6B and 6C are schematic views showing how a first and a second field typically appear on links A and B when a diamond-shaped pattern is output on the screen.
Figure 6B:
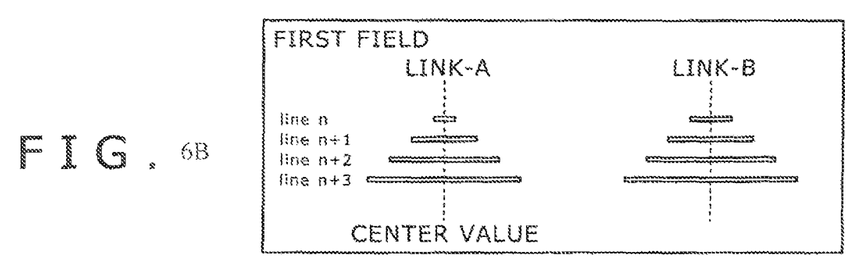
Figure 6C:
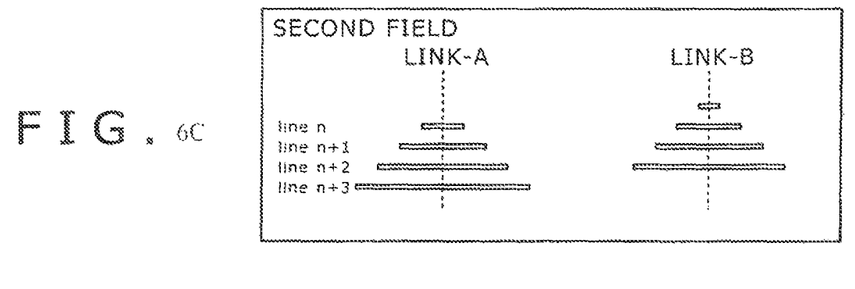

Suppose that a diamond-shaped pattern (wipe or key) is output on the screen as shown in FIG. 6A. In this case, as shown in FIGS. 6B and 6C giving enlarged views of an apex of the diamond-shaped pattern, what appears in the first and the second fields for link A looks different from that for link B. In the first field, the image of link A precedes that of link B so that on the same line, the pattern width of link A is less than that of link B. In the second field, by contrast, the image of link B precedes that of link A so that the pattern width of link A is greater than that of link B on the same line.

Figure 7A:
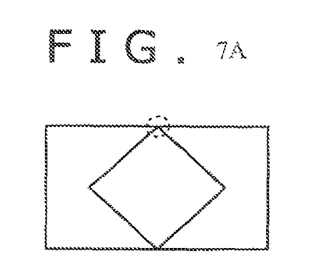
FIGS. 7A, 7B and 7C are schematic views showing how the first and the second fields typically appear on links A and B when an image is generated with its diamond-shaped pattern protruding slightly from the angle of view.
Figure 7B:
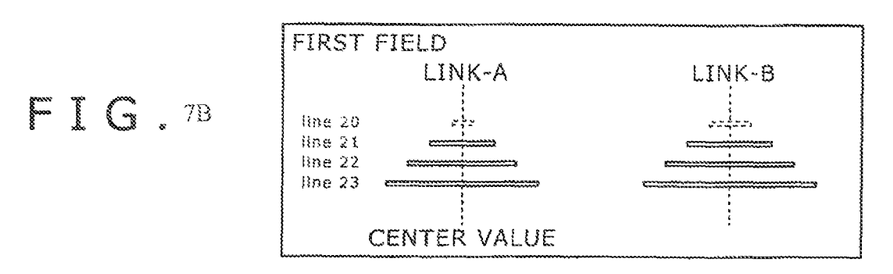
Figure 7C:
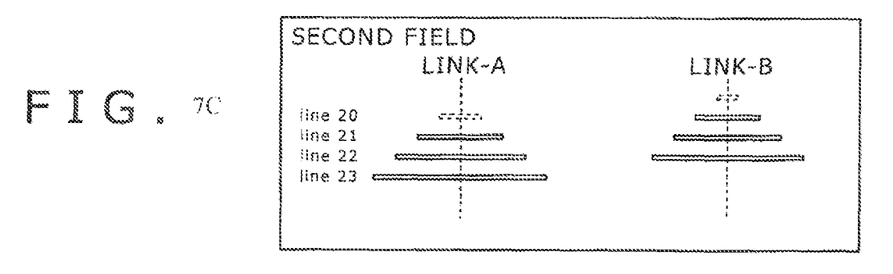

Suppose now that a diamond-shaped pattern protruding slightly from the angle of view is generated as shown in FIG. 7A. In this case, as shown in FIGS. 7B and 7C giving enlarged views of an apex of the diamond-shaped pattern, the pattern subsequent to line 21 in the first field constitutes a video data area for both links A and B; the pattern on and before line 20 is invisible. In the second field, the data on link B constitutes a video data area from line 20 on. That means the pattern on line 20 remains visible.

In the above-mentioned wipe process, the following hardware-based controls are exercised on the initial value "Pattern_Ramp_Init(slope_v)" of a RAMP waveform:

Link A: field 2=field 1+(half the increment value)
Link B: field 1=field 2+(half the increment value)

A Field Odd/Even (FLOE) signal is used for field recognition. In terms of hardware, the FLOE signal on the side of link B is inverted for field recognition purposes. The FLOE signal is a signal that specifies whether a given field is odd or even and is generated by a synchronizing signal generator inside the main unit 40. The synchronizing signal generator supplies a VD signal and the FLOE signals (FIG. 3) to the components involved. During progressive scheme processing, the FLOE signal is inverted per frame. Given the FLOE signal that is either inverted or not inverted, the same video processor is switched between two modes of operation, working on either the first field or the second field under the interlace scheme. Where the same apparatus is used to handle images under the interlace scheme, the inverting of the FLOE signal need only be halted. The blanking interval on the side of link B is enlarged by one line.

Since the pattern is found protruding upward (line 20) in the example above, line 20 is subjected to a blank mask to truncate the protrusion. More specifically, since the wipe intrudes into the blanking area by one line in the second field on link B, the blanking area is enlarged by one line before being masked. This arrangement blocks the video signal from passing through, thereby removing the intruding signal. When the output video signal is fed to an apparatus that uses the blanking area for transmitting something other than images, the inventive arrangement protects the apparatus from getting adversely affected by the intruding signal. Compositing is accomplished without extraneous intrusions when the blanking area is applied before the waveforms are used inside the compositing circuits 22A and 22B for diverse composite processing or key signal generation.

Where the wipe does not progress, the same first and second fields are repeated. Where the wipe progresses, the wipe boundary is defined simply as $$y=ax+b$$

and that the boundary moves in keeping with time "t" in the relation defined as $$b=k-rt$$

Because wipe progression is also controlled in units of fields under the interlace scheme, the wipe boundary is positioned by one of the two video processing circuits (on link A or B) using the expression $$x=(y-b)/a$$

which is obtained by inverting the expression $$y=ax+b$$

where,
y=0, 2, 4, 6, etc., (even-numbered lines) for the first field, and
y=1, 3, 5, 7, etc., (odd-numbered lines) for the second field.

In the dual link setup, the outputs from the two video processing circuits are composited to obtain an output image in which all lines (i.e., even-numbered and odd-numbered lines) have been suitably processed. At a given time "t," the wipe boundary is acquired in such a manner that the relations defined as $$b=k-rt$$

$$y=ax+b$$

hold on all lines.

If the wipe waveform is generated from the same value "t" (i.e., fader value) in the first and the second fields, the progression may be reduced by half or the even-numbered and odd-numbered lines may become misaligned. This bottleneck is circumvented by having the value "t" controlled in units of fields (in units of frames under the progressive scheme). Where the fader lever is manually operated, the value "t" to be used is not the same as the current time itself but a value proportional to the position of the fader lever. The transmission of the value from the fader lever is effected uninterruptedly in units of fields (in units of frames under the progressive scheme).

Figure 8:
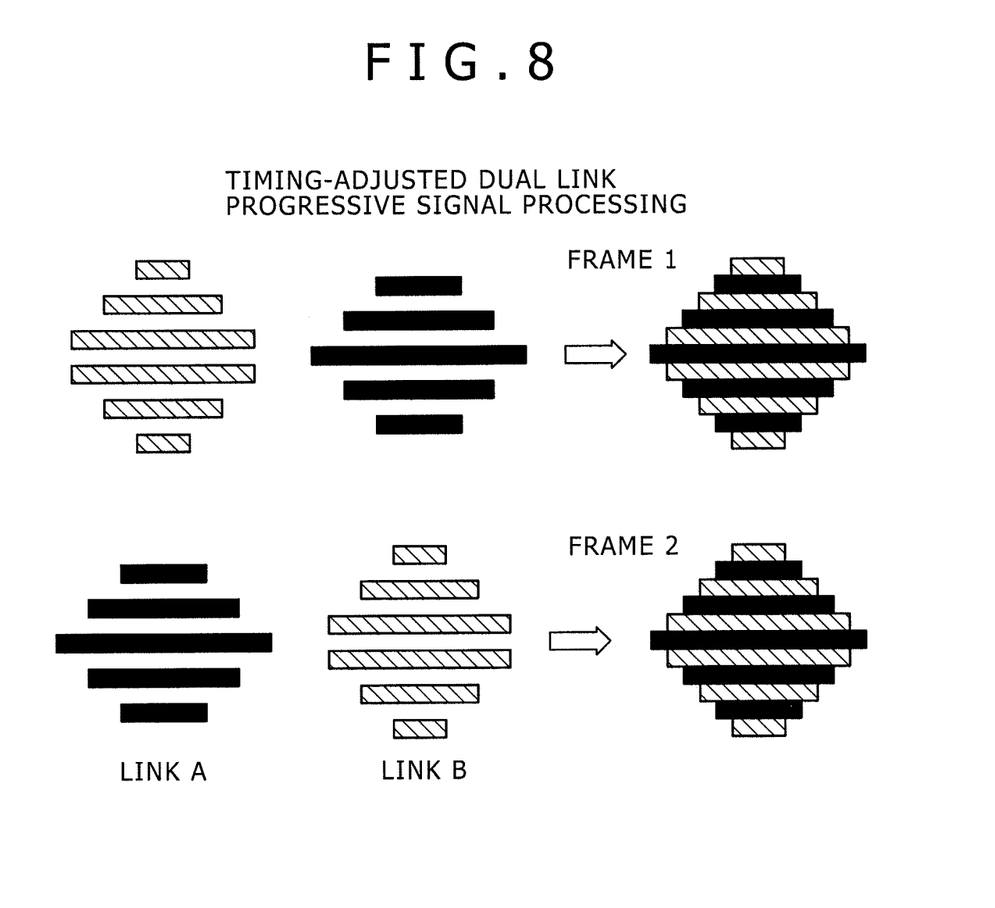
FIG. 8 is a schematic view showing a typical video output resulting ultimately from dual link-compatible video processing performed by the effect switcher on progressive signals.

With the effect switcher 100, the above timing adjustments are carried out to provide video processing compatible with the dual link progressive scheme as shown illustratively in FIG. 8. This makes it possible to perform high-quality video processing such as wipes without changing the processed content of each frame.

In the effect switcher 100, upon video processing of an odd-numbered frame under the progressive scheme, the controller 30 may cause the first video processor 20A to operate at settings such that the waveform generating means thereof (i.e., key processing circuit 21A) operates on the first field under the interlace scheme while causing the second video processor 20B to operate at settings such that the waveform generating means thereof (i.e., key processing circuit 21B) operates on the second field under the interlace scheme. Also upon video processing of an even-numbered frame under the progressive scheme, the controller 30 may cause the first video processor 20A to operate at settings such that the waveform generating means thereof (key processing circuit 21A) operates on the second field under the interlace scheme while causing the second video processor 20B to operate at settings such that the waveform generating means thereof (key processing circuit 21B) operates on the first field under the interlace scheme. In this manner, the wipe processing compatible with the dual link progressive scheme is carried out.

The inventive arrangements above eliminate the quality-related problems experienced in the past when the first video processor 20A and the second video processor 20B were controlled exactly in the same manner. The traditional control method caused the signals with their waveforms generated internally to affect the even-numbered and odd-numbered lines exactly the same way, leading to image quality degradation. According to the embodiment of the invention, by contrast, the signals whose waveforms are internally generated are arranged to affect the lines in a manner corresponding to the number of scanning lines inherent in the progressive scheme, whereby high-quality, value-added images are output.

Furthermore, the blanking area may be subjected to appropriate mask controls so as to protect the area in question from quality deterioration. This makes it possible for the video signal to be used without hindrance by other apparatuses.

In addition, the circuits of the interlace-scheme video processing apparatus may be partially supplemented, with few modifications, by adding circuits and controls to handle processes under the dual link progressive scheme as well. When a single apparatus can thus be switched between uses under the interlace scheme and under the dual link progressive scheme, the resulting cost savings can be significant.

In the foregoing examples, the present invention was explained using a pair of video processors. Alternatively, the invention can also be applied advantageously to a plurality of pairs of video processors (i.e., the total processor count is an even number) established to handle complicated processes.

The present application contains subject matter related to that disclosed in Japanese Priority Patent Application JP 2008-095447 filed in the Japan Patent Office on Apr. 1, 2008, the entire contents of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A video processing apparatus for performing video processing compatible with a dual link progressive scheme, said video processing apparatus comprising:
    two video processing circuits each comprising a waveform generating unit, wherein said two video processing circuits are operable to generate a video processing effect by superimposing a first background signal of a plurality of background signals on a second background signal of said plurality of background signals; and
    a control section operable to control said two video processing circuits in operation;
    wherein, when a given frame is subjected to video processing under a progressive scheme to generate said video processing effect, said control section causes one of said two video processing circuits to operate at first time settings such that said waveform generating unit thereof operates on a first field under an interlace scheme while causing the other of said two video processing circuits to operate at second time settings such that said waveform generating unit thereof operates on a second field under said interlace scheme.

2. The video processing apparatus according to claim 1, wherein, when an odd-numbered frame is subjected to video processing under said progressive scheme, said control section causes said one of said two video processing circuits to operate at settings such that said waveform generating unit thereof operates on said first field under said interlace scheme while causing said other of said two video processing circuits to operate at settings such that said waveform generating unit thereof operates on said second field under said interlace scheme; and
    wherein, when an even-numbered frame is subjected to video processing under said progressive scheme, said control section causes said one of said two video processing circuits to operate at settings such that said waveform generation unit thereof operates on said second field under said interlace scheme while causing said other of said two video processing circuits to operate at settings such that said waveform generation unit thereof operates on said first field under said interlace scheme.

3. A video processing method for performing processing compatible with a dual link progressive scheme, said processing method comprising:
    controlling, in operation, two processing circuits each comprising a waveform generating unit, wherein said two video processing circuits are operable to generate a video processing effect by superimposing a first background signal of a plurality of background signals on a second background signal of said plurality of background signals; and
    when a given frame is subjected to video processing under a progressive scheme to generate said video processing effect:
    causing one of said two processing circuits to operate at first time settings adjusted to a scan line such that the waveform generating unit thereof operates on a first field under an interlace scheme; and causing the other of said two processing circuits to operate at second time settings adjusted to another scan line such that said waveform generating unit thereof operates on a second field under said interlace scheme.

4. The video processing apparatus according to claim 1, wherein said video processing effect is a wipe effect.

5. The video processing apparatus according to claim 1, wherein said first field and said second field is recognized by a field odd/even signal.

6. The video processing apparatus according to claim 1, wherein during said generation of said video processing effect, an image of a first link in said first field precedes an image of a second link in said first field.

7. The video processing apparatus according to claim 1, wherein during said generation of said video processing effect, an image of a second link in said second field precedes an image of a first link in said second field.

8. The video processing apparatus according to claim 1, wherein said two video processing circuits are operable to composite said first background signal and said second background signal in accordance with a composite ratio, and wherein said composite ratio is based on a user input.

9. The video processing apparatus according to claim 1, wherein said two video processing circuits are operable to generate a key signal, and wherein an area designated by said key signal is replaced with any one or more of said plurality of background signals in order to composite a key fill signal.

10. The video processing apparatus according to claim 9, wherein said key signal designates one of multiple degrees of density with which to superpose said key fill signal on said one or more of said plurality of background signals.

* * * * *